United States Patent [19]
Simmers

[11] Patent Number: 5,841,431
[45] Date of Patent: Nov. 24, 1998

[54] APPLICATION OF SPLIT- AND DUAL-SCREEN LCD PANEL DESIGN IN CELLULAR PHONES

[75] Inventor: Charles Russell Simmers, Phoenix, Ariz.

[73] Assignee: Intel Corporation, Santa Clara, Calif.

[21] Appl. No.: 749,486

[22] Filed: Nov. 15, 1996

[51] Int. Cl.[6] .............................. G09G 5/00; G09G 3/36; G06F 1/00; G06F 1/16

[52] U.S. Cl. ..................... 345/211; 345/103; 364/705.05; 364/707; 364/708.1

[58] Field of Search .................................... 345/211, 103, 345/104, 98, 100, 131, 156, 173; D14/137, 138; 364/705.05, 707, 708.1; 379/433, 428, 440; 395/750, 750.04; 455/556, 566, 574, 575, 89, 90

[56] References Cited

U.S. PATENT DOCUMENTS

| | | |
|---|---|---|
| D. 370,673 | 6/1996 | Happo et al. ........................... D14/138 |
| D. 374,227 | 10/1996 | Williams ................................ D14/138 |
| D. 377,341 | 1/1997 | Imai et al. ............................. D14/138 |
| 4,816,816 | 3/1989 | Usui . |
| 5,189,632 | 2/1993 | Paajanen et al. ....................... 364/705 |
| 5,392,058 | 2/1995 | Tagawa ................................... 345/104 |
| 5,410,329 | 4/1995 | Tagawa et al. .......................... 345/104 |
| 5,534,892 | 7/1996 | Tagawa ................................... 345/104 |
| 5,548,765 | 8/1996 | Tsunoda et al. ......................... 395/750 |
| 5,663,745 | 9/1997 | Ishikawa et al. ......................... 345/98 |

*Primary Examiner*—Steven J. Saras
*Assistant Examiner*—David L. Lewis
*Attorney, Agent, or Firm*—Blakely, Sokoloff, Taylor & Zafman

[57] ABSTRACT

An apparatus for conserving power in information devices with dual functions. A single display panel is logically split into two sub-panels. Each sub-panel can be powered up or down separately as is required by the function of the device. The display panel has a plurality of improved segment drivers which are provided power signals enabling the set of segment drivers corresponding to a sub-panel to be separately powered. In systems with two separate display panels, each of the panels may be powered up or down by the use of similar improved segment drivers as necessary.

11 Claims, 6 Drawing Sheets

APPLICATION OF SPLIT- AND DUAL-SCREEN LCD PANEL DESIGN IN CELLULAR PHONES

BACKGROUND OF THE INVENTION

1. Field of the Invention

The present invention relates to the field of display devices. More specifically, the present invention relates to graphical displays connected to information devices.

2. Description of Related Art

In high-end "smart" cellular phones, which function both for telecommunications and for storing and retrieving information (e.g., a Personal Digital Assistant (information device)), it is often necessary to provide two displays, one for each function. The smaller of the displays, used for the telecommunications function, commonly consists of between ten and twenty characters across (columns) and three to eight rows. The larger of the displays, used for the information device function, is a graphical display with a resolution of typically 640 pixel columns across by 240 pixel rows.

Traditionally, each display was treated as a separate system since the smaller display operates continuously, while the larger display operates more sparingly. In periods of non-use, the large display is powered-down. Disadvantageously, each display has its own controller to convert information into displayable pixels and its own integrated circuits which drive the pixels to be output on the display panels. In battery-operated and power-conscious devices such as PDAs, the redundancy of having two sets of drivers, integrated circuits and controllers is expensive and can also increase the mean-time-between-failure for the devices. Further, where a single display is used for both functions, the entire display must be active, even when only a small sub-panel of the display is required to operate (i.e., for telecommunications). In such a circumstance, the power drain is excessive for the function served, and, therefore, highly inefficient.

Thus, there is a need to reduce the power drain of such devices by allowing independent operation of only one display, in the case of two separate displays, and a sub-panel in the case of single physical display.

SUMMARY

In the case of some dual-function information devices such as a cellular phone with PDA, two separate physical displays are controlled by a single video controller. The video controller provides a plurality of control signals to drivers which drive pixels onto the displays. The invention provides a power control block which is coupled to those drivers to selectively power-down drivers for the larger of the two displays, while keeping powered-up the smaller of the displays. The power control block can be programmed by a user/software to power-up or power down the displays as dictated by the use of the Information device. The power control block is, therefore, coupled to a CPU or other such processor from which it receives commands regarding which display to keep powered-up and which to power down.

Alternatively, in dual-function information devices where there is only one physical display for the information device, a similar power control block can be programmed by instructions being entered by the CPU to selectively power-down certain pixel drivers for the display and thereby create a logical "sub-panel". A single display screen may be split into two or more logical sub-panels, each of which has corresponding drivers which output pixels to their portion of the display, and are independently powered-up or down as the application requires.

DETAILED DESCRIPTION OF THE DRAWINGS

Figure 1:
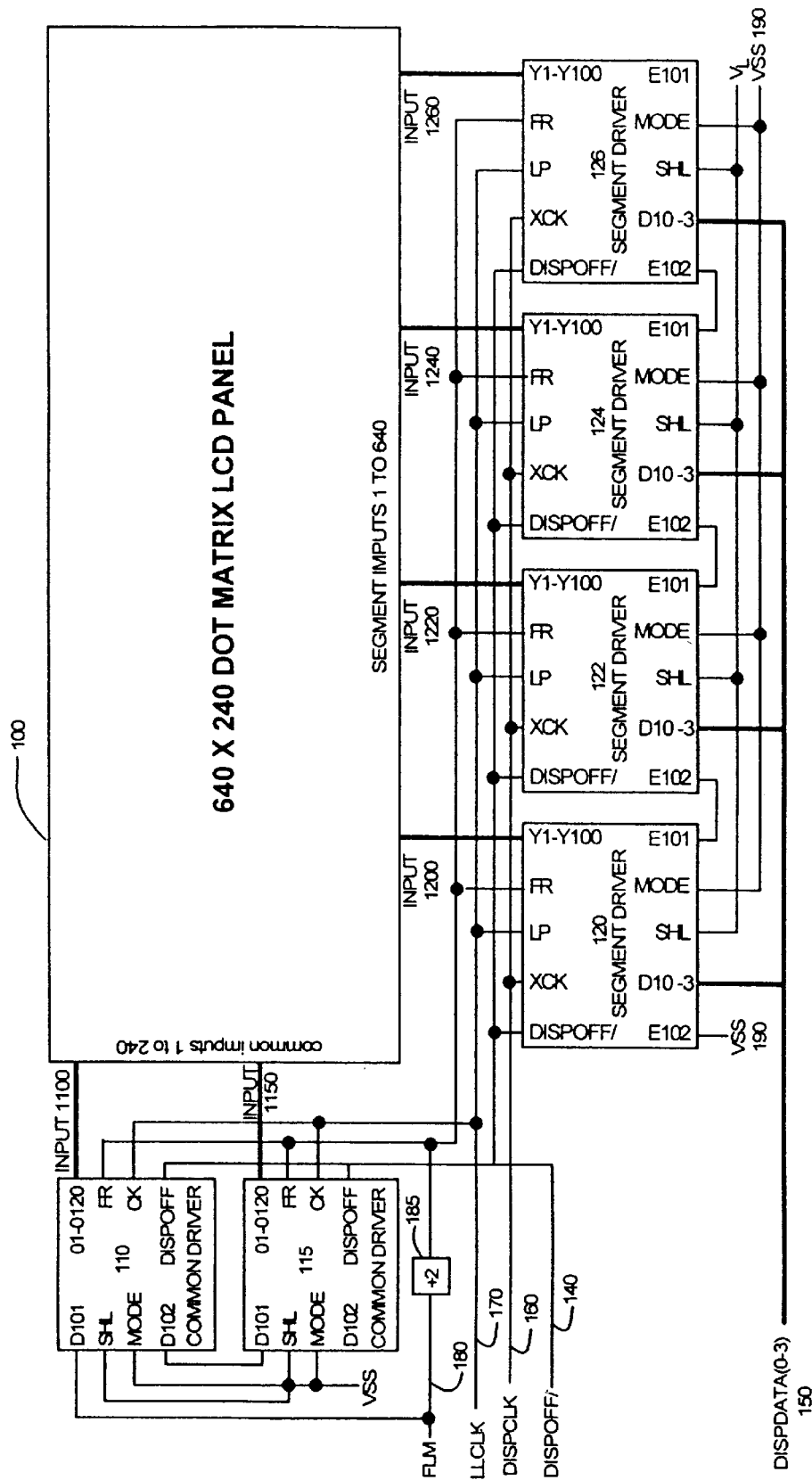
FIG. 1 is an operational diagram of a typical LCD display according to the prior art.

FIG. 1 is an operational diagram of a typical LCD display according to the prior art.

FIG. 1 shows a 640 by 240 dot-matrix liquid crystal display (LCD) panel 100 which is driven by two inputs 1100 and 1150 for rows running down the vertical axis of panel 100 and also by four inputs—1200, 1220, 1240 and 1260—driving pixels in columns across the horizontal axis of panel 100. Thus, on a 640 by 240 pixel display such as LCD panel 100, input 1100 is responsible for the first 120 rows of pixels and input 1150 is responsible for the last 120 rows of pixels. For LCD panel 100, input 1200 drives the first 160 columns of pixels, input 1220 the second 160 columns of pixels, input 1240 the third 160 columns of pixels and input 1260 the last 160 columns of pixels of LCD panel 100. LCD panel 100 may be used on a notebook computer, a personal digital assistant (PDA), cellular phone or for use in any information device capable of utilizing an LCD output.

The output of such LCD panels are typically driven by "segment" drivers driving the pixel columns on the horizontal axis and by "common" drivers which enable pixel rows on the vertical axis of the panel. The physics of driving pixel output on display panels is well-known in the art and will not be described in depth. Common driver 110 and common driver 115 generate input signal 1100 and input signal 1150, respectively, while segment driver 120, segment driver 122, segment driver 124 and segment driver 126 generate input signals 1200, 1220, 1240 and 1260, respectively. Each of these segment drivers convert serial data into parallel data and generate for output level translator signals which map an incoming digital signal into certain voltage levels which the LCD panel converts into pixel intensities based on the voltage level differentials. The common drivers activate a particular row for displaying output generated by the segment drivers.

Also shown in FIG. 1 are several control signals originating from the display controller of the cellular phone, information device or computer system that utilize the display capability of LCD panel 100. Shown are a display off control (DISPOFF) signal 140, a display data (DISPDATA) signal 150, a display clock (DISPCLK) signal 160, a line latch clock (LLCLK) signal 170, and a first line marker (FLM) signal 180. Also input to the drivers are two voltage signals, VL 197 and VSS 190. These voltage signals, VL 197 and VSS 190, can be used to indicate different logic levels to the pins they supply.

DISPDATA 150 is a signal comprised of four or eight bits—0, 1, 2 and 3 or 0 through 7—which are transmitted in parallel and represent light/color intensity levels to be output on LCD panel 100 and originates from a display controller device. DISPDATA deviate 150 is output on LCD panel 100 with bit 0 in the upper left corner of the screen and bits 1, 2 and 3 output on the same row from left to right starting after bit 0. The serial to parallel conversion of DISPDATA 150 is carried out by the timing signal DISPCLK 160 which originates from a clocking mechanism. DISPCLK 160 clocks the 4 bits of DISPDATA 150 into shift registers contained in the segment drivers. Once the shift registers in segment driver 120 are full, then another or similar clocking mechanism asserts the line latch clock (LLCLK) 170 signal to common driver 110. As shown in FIG. 1, the line latch clock is also connected to a latch pulse (LP) pin or input on segment drivers 120, 122, 124 and 126, such that when the shift registers are filled with bits of display data and the LLCLK signal 170 has been asserted, the bits stored in the shift registers are latched and transferred over input line 1200 to LCD panel 100. The LLCLK signal 170 which essentially loads an entire row of pixels to LCD panel 100, also clocks the common driver incrementing the shift register of the common driver 110 by one such that the LCD panel can enable the next row of the panel for pixels driven by the segment drivers once a row has been completed. DISPDATA 150 transmits a four-bit signal (in parallel), corresponding to four pixels for the LCD panel, to the segment drivers.

Once all of the rows of pixels have been output in this manner, such that the display of pixels is completed for one image frame, a first line marker (FLM) signal 180 is again asserted, which is also clocked with the line latch clock LLCLK 170. First line marker signal 180 propagates through all of the shift registers of all common and segment drivers resetting the shift registers to zero, such that the common driver 110 is set to enable the next new row of pixel data to be output by the segment drivers. Likewise, segment drivers 120, 122, 124, 126 are also reset to receive the next set of pixel data from DISPDATA 150.

The DISPOFF signal 140 shown in FIG. 1, when driven active, disables the output for all pins and thereby blanks LCD panel 100 such that no pixels are output to the panel. FLM 180 is also divided by two by a divider circuit 185 to periodically reverse the polarity of the pins where inputs 1200, 1220, 1240, 1260 and inputs 1100 and 1150 are output by the segment and common drivers. Periodically, reversing polarity is necessary because the typical LCD requires an alternating current (AC) signal such that the liquid crystal does not "plate-out" against the electrodes and turn black. Thus, the FR pin is periodically reversed and sets the internal shift registers at one, rather than zero. Other pins shown in the segment drivers 120, 122, 124 and 126 are an XCK pin, which receives the DISPCLK signal 160, the DISPOFF pin, which receives the DISPOFF signal 140, and an output pin labeled Y1–Y160, which transmits the pixels which are stored in the shift registers of the segment drivers to the LCD panel 100. Also shown in FIG. 1 are external input/output expansion pins EIO-1 and EIO-2 for each of the segment drivers 120, 122, 124 and 126.

The expansion pins EIO-1 and EIO-2 are connected together such that the EIO-1 pin of segment driver 120 loads a ground or loads a negative voltage value from EIO-1 of segment driver 120 to EIO-2 of segment driver 122, indicating that the first 160 pixels have been output by segment driver 120 and that the next 160 pixels of the row may be output by segment driver 122. This daisy-chaining is provided also for the segment drivers 122 to 124 and 124 to 126 by propagating either ground/negative value to these segment drivers to complete the pixel row. Likewise, on common drivers 110 and 115 are pins DIO-1 and DIO-2, which are daisy-chained together such that when the first 120 rows of pixels enabled by common driver 110 are completed, common driver 115 receives the remainder of the data and completes pixel rows 121 through 240. The FR pin, or frame pulse pin, of common drivers 110 and 115 operate similarly to the FR pins of segment drivers 120, 122 124 and 126 and will not be described further. Likewise, the DISPOFF pins of the common drivers 110 and 115 operate similarly to the DISPOFF pins of segment drivers 120, 122, 124 and 126 and will not be described further. Common driver 110 has a CK pin which is driven from LLCLK signal 170 and, in a given time index, represents the number of rows which have been output to the LCD panel 100. The SHL pin of the segment drivers 120, 122, 124 and 126, as well as the SHL pin of common drivers 110 and 115 serve to indicate in which direction pixels representing the image are output to the display, whether left to right, right to left or, in the case of the common drivers, top to bottom, or bottom to top.

Further, a mode pin is provided on all of the segment drivers and the common drivers which, when input a certain logic level from VSS 190, indicates a mode in which the drivers operate. VL 197 is shown as an input level to the SHL pins of the segment drivers and by its logic level indicates what direction the image is being output in. The physics underlying the liquid crystal display is well known in the art and will not be described so as not to obscure the invention. According to the prior art, therefore, the entire bank of segment drivers 120, 122, 124 and 126 is always powered-up and enabled for output. There is no signal or mechanism to power separately, any of the segment drivers. Thus, when only a portion of the panel has displayable output such as when the information device functions as a telecommunications device, the power consumed by the rest of the panel and their segment drivers is wasted.

Figure 2:
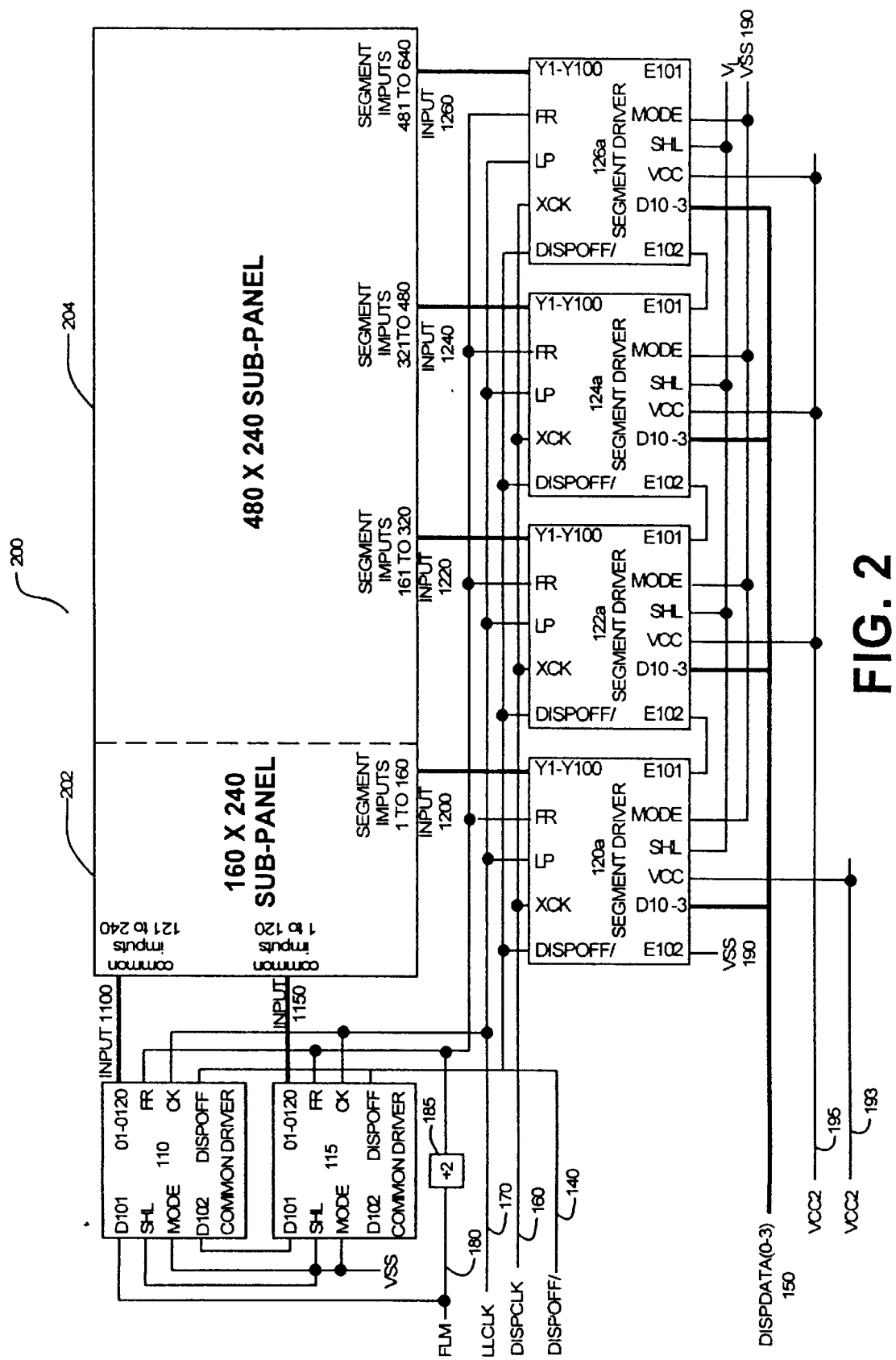
FIG. 2 is an operational diagram of a split screen LCD display according to one embodiment of the invention.

FIG. 2 illustrates an operational diagram of a split screen LCD panel according to one embodiment of the invention.

All pins of the segment and common drivers, input and control signals which toggle them as described with respect to FIG. 1 with identical reference numbers operate similarly with regard to this embodiment of the invention and will not be repeated. However, the invention provides for additional control by way of VCC pins on each of the segment drivers as well as splitting VCC into separate signals VCC1 195 and VCC2 193. Thus, a typical segment driver circuit would need to be modified as follows to provide for split panel LCD operation.

According to the embodiment shown in FIG. 2, a single 640 by 240 resolution dot matrix LCD panel 200, which is similar to the 640 by 240 resolution LCD panel 100 of FIG. 1, is split logically into a 160 by 240 size sub-panel 210 and a 480 by 240 size sub-panel 204. By logically splitting a single LCD panel into two sub-panels, it is possible to save power by powering down the sub-panel of LCD panel 200 which is not being used. As shown in FIG. 1, the DISPOFF signal powers down the entire panel and does not allow powering down a sub-panel (i.e., certain segment drivers) of the entire panel. The power savings results from certain of the segment drivers no longer being clocked and no longer consuming power. Further power savings and probably the greater proportion of power savings is gained from not having to drive or toggle the states of the pixels in sub-panel 204.

The invention provides an improved segment driver circuit with the capability of being enabled or powered independent of other segment drivers. Specifically, a VCC pin is provided to each of the modified segment drivers 120a, 122a, 124a and 126a. These VCC pins are the positive power rails to each segment driver.

As shown in FIG. 2, sub-panel 202 has all 240 rows of pixels but occupies only 120 pixel columns. Thus, to independently operate sub-panel 202, only segment driver 120a, which drives the first 120 pixel columns (see description of similar driver 120 of FIG. 1), needs to be controlled.

Therefore, the invention provides control of VCC2 193 coupled to the VCC pin of segment driver 120a. When VCC2 193 is enabled (on), the VCC pin on segment driver 120a will power-on the segment driver to output pixels. When VCC2 193 is disabled (switched off), the segment driver 120a is powered-down or off and cannot drive pixel output to the display panel.

Likewise, another signal VCC1 195 is coupled to the VCC pins of each segment drivers 122a, 124a and 126a, which drive pixels on the other sub-panel 204. When VCC1 195 is on, the segment drivers 122a, 124a and 126a are all powered on and enabled to drive pixel output to the panel 200 (in sub-panel 204). When VCC 195 is off, all of the segment drivers 122a, 124a and 126a are powered down and cannot drive pixels to the display panel. The three segment drivers 122a, 124a and 126a all utilize a single source for their VCC pins since, according to the embodiment, they drive the same sub-panel.

Thus, sub-panel 202 and sub-panel 204 are capable of being independently powered, and thereby selected by the use of separate signals. VCC1 195 and VCC2 193 will be on when both sub-panels must be powered. One skilled in the art will recognize that a single panel may be split into as many logical sub-panels as segment drivers will allow. In this case, panel 200 may be split into four logical sub-panels, one for each segment driver, each segment driver powered by its own VCC signal.

Figure 6:
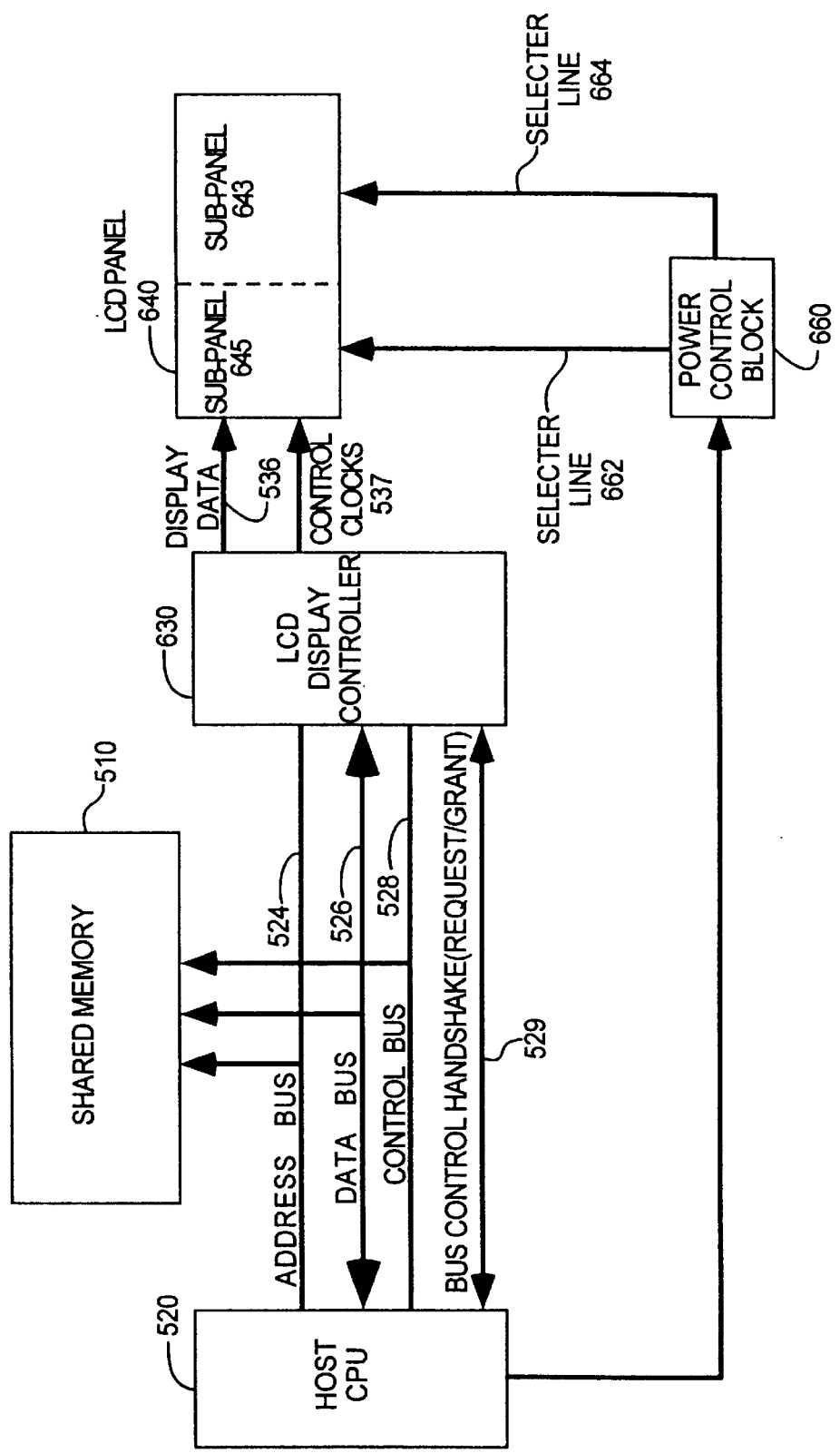
FIG. 6 is a system diagram of a computer system with a split-screen LCD panel according to one embodiment of the invention.

The power source VCC1 195 and VCC2 193 are controlled from some software/hardware which selects the functionality of the panel, and therefore, indicates which sub-panels are to be powered (see power control block 660 of FIG. 6).

Figure 3:
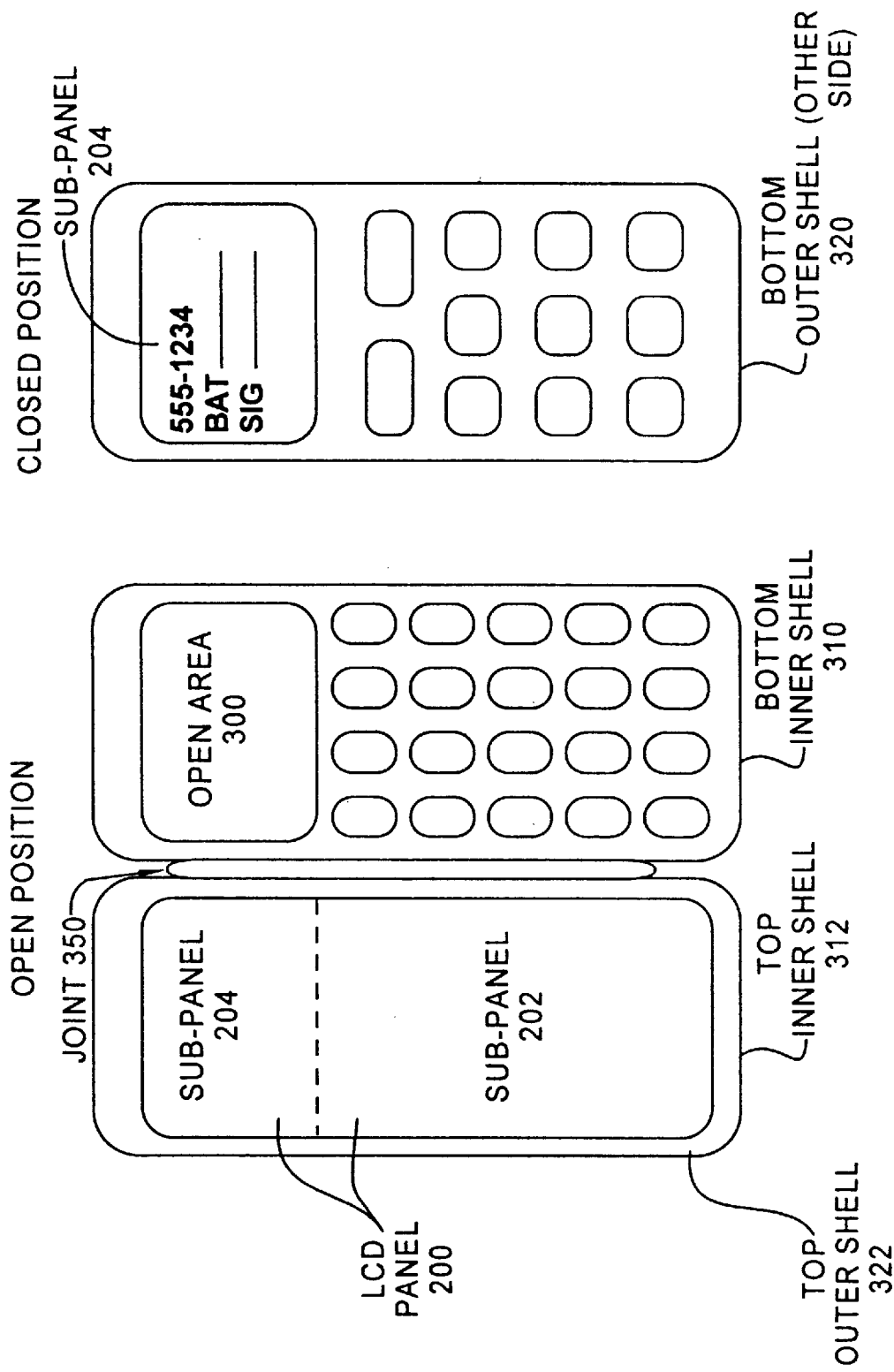
FIG. 3 is an illustration of how a split screen LCD display may be utilized in a information device.

FIG. 3 shows the casing structure for an information device according to one embodiment of the invention. The information device is capable of functioning both as a cellular phone for telecommunications and as a PDA. The LCD panel 200, is split logically into sub-panel 204 and sub-panel 202. The information device has a top outer shell 320 and a bottom outer shell 322 as well as a top inner shell 310 and a bottom inner shell 312. Top inner shell 310 and its obverse side top outer shell 320 bounds and contains LCD panel 200 and is connected to joint 350 about which the top information device is able to fold. Likewise bottom inner shell 312 with its obverse side bottom outer shell 322, is also able to fold about joint 350. Bottom inner shell 312 and bottom outer shell 322 may both contain input keys such as alpha-numeric and function keys with which a user can input data, make telephone calls and/or control operation of the information device. Top inner shell 310 has an open area 300 which may be open aperture or some transparent panel which closed upon LCD panel 200, makes visible the image in sub-panel 204, thus allowing monitoring of the friction for which sub-panel 202 is intended.

The information device is "closed" when bottom inner shell 312 and top inner shell 310 abut one another by folding the Information device about joint 350. When the information device is closed, the open area 300 closely abuts the area of sub-panel 204 such that the image contents (pixels) on output sub-panel 204 are visible to the user. When closed, the outer shell 320, which may or may not be transparent (excepting open area 320), covers sub-panel 202 which is contained in inner shell 312. Upon closing the information device, a switch, relay or contact disposed about or within joint 350 will operate to power down the driver(s) for sub-panel 202 while leaving the driver(s) for sub-panel 204 powered-up. This relay or contact will toggle the VCC pins of the appropriate segment drivers as discussed in FIG. 2. Thus, when the information device is closed, sub-panel 204 is operational while sub-panel 202 is disabled thereby saving power and screen life. This still allows the user to monitor the telecommunications function of the information device. Further, by using one physical display rather than two separate physical displays, the information device saves by reducing device complexity and cost.

As shown in FIG. 3, when closed, sub-panel 204 shows a telephone number, a "BAT" indicator indicating the level of battery life in the device and a "SIG" indicator all which are still visible to the user. Underneath, the portion of LCD panel 200 covered by outer shell 320, i.e., sub-panel 202, is powered down and inoperative. Thus, the telecommunications display of the information device can be viewed on a sub-panel while the information device one display is closed and data sub-panel is powered down.

When the information device is in the "open" position, both sub-panels 202 and 204 are powered. In this mode, both the data function and telecommunications functions can be displayed on panel 200. Thus, all segment drivers are powered when the Information device is open. In this embodiment, the selection of individual sub-panels via software is not needed since the position of the information device makes the selection.

Figure 4:
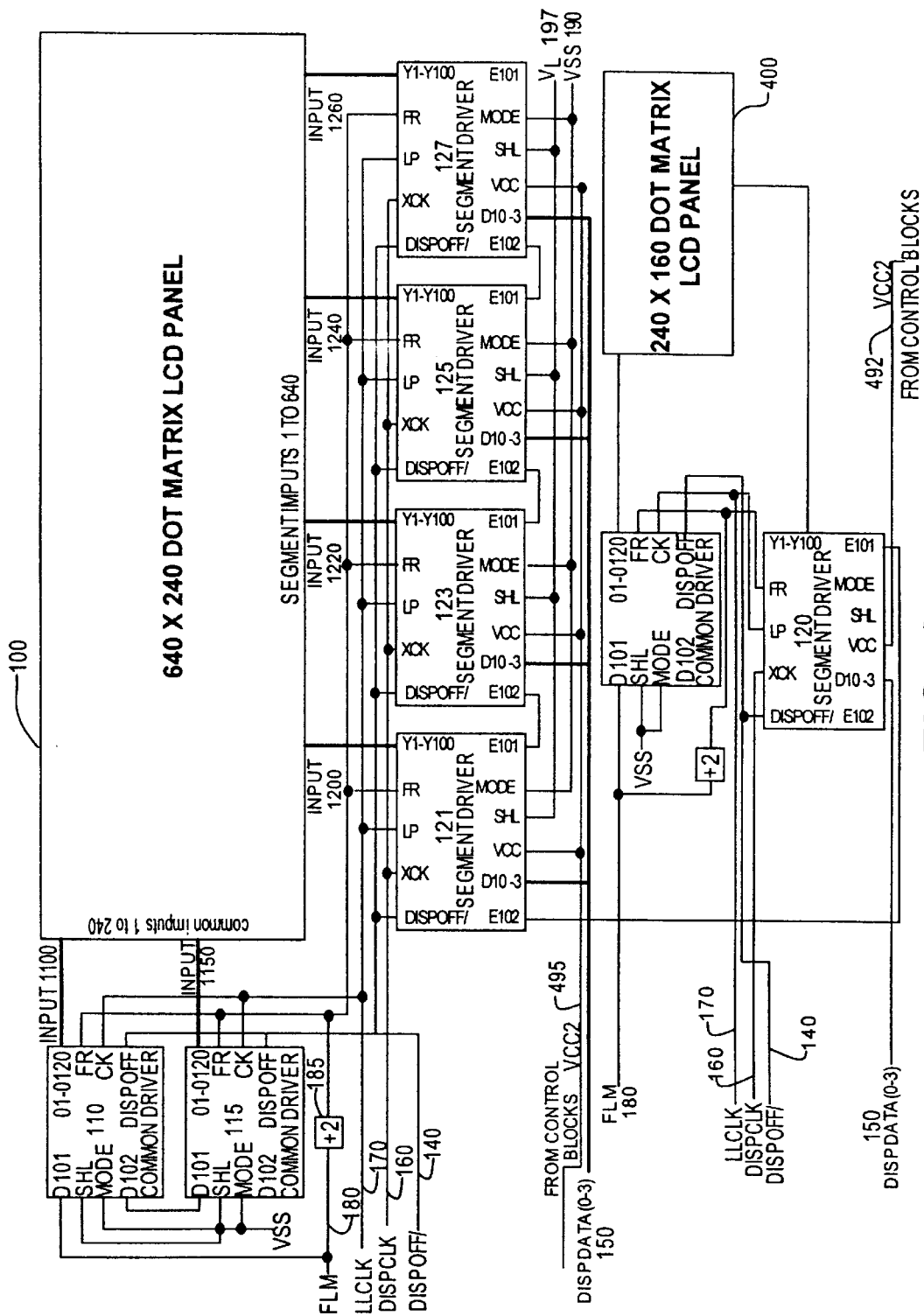
FIG. 4 is an operational diagram of a dual screen LCD display according to one embodiment of the invention.

FIG. 4 shows a information device with two separate displays, according to one embodiment of the invention.

When an information device, by design has two separate displays located on different physical planes, the invention provides for powering down one display, while keeping the other active, depending on what function is being carried out on the device. Shown in FIG. 4 is a first LCD panel 100 and a second display LCD panel 400. LCD panel 400, if it is to use the same controller signals as the LCD panel 100, must have an equal number of rows of pixels as LCD panel 100, and consequently, the same duty cycle. Without the same vertical resolution, the controller would need to refresh to the larger of the two resolutions thereby undermining bus bandwidth, memory resources and frame rates.

System software and the video controller would treat the combination of LCD panel 100, which has a 640 by 240 resolution, and LCD panel 400 with a 160 by 240 resolution, as a single logical panel of 800 by 240. Segment driver 420 which drives LCD panel 400 receives the first set of the input data bits from DISPDATA signal 150 and upon filling its shift registers, propagates a daisy-chaining command to segment driver 121. Segment driver 121 is modified from segment driver 120a of FIG. 2 in that the EIO2 pin is extended to EIO1 output pin of segment driver 420. VSS is now connected to EIO2 so that segment driver 420 receives the input stream before segment drivers of LCD panel 100.

The separate display panels 100 and 400 are controlled similar to the split-screen (sub-panel) embodiment described above for FIG. 2. Each of the segment drivers 121, 123, 125 and 127 of panel 100 and segment driver 420 is provided with separate VCC pins. The invention also provides a power source VCC2 493 coupled to the VCC pin of segment driver 420. When VCC2 493 is on, the VCC pin on segment driver 420 will power-on the segment driver 420 to output pixels to panel 400. When VCC2 493 is off, the segment driver 420 is powered-down or off and cannot drive pixel output to panel 400.

Likewise, another power source VCC1 495 is coupled to the VCC pins of each segment drivers 121, 123, 125 and 127, which drive pixels on display panel 100. When VCC1 495 is on, the segment drivers 121, 123, 125 and 127 are all powered on and enabled to drive pixel output to the panel 100. When VCC1 495 is off, all of the segment drivers 121, 123, 125 and 127 are powered down and cannot drive pixels to the display panel. The three segment drivers 121, 123, 125 and 127 all utilize a single signal for their VCC pins since, according to the embodiment, they drive the same sub-panel.

Thus, display panels 100 and 400 are capable of being independently powered, and thus, independently selected. VCC1 495 and VCC2 493 will be on when both display panels must be powered.

Figure 5:
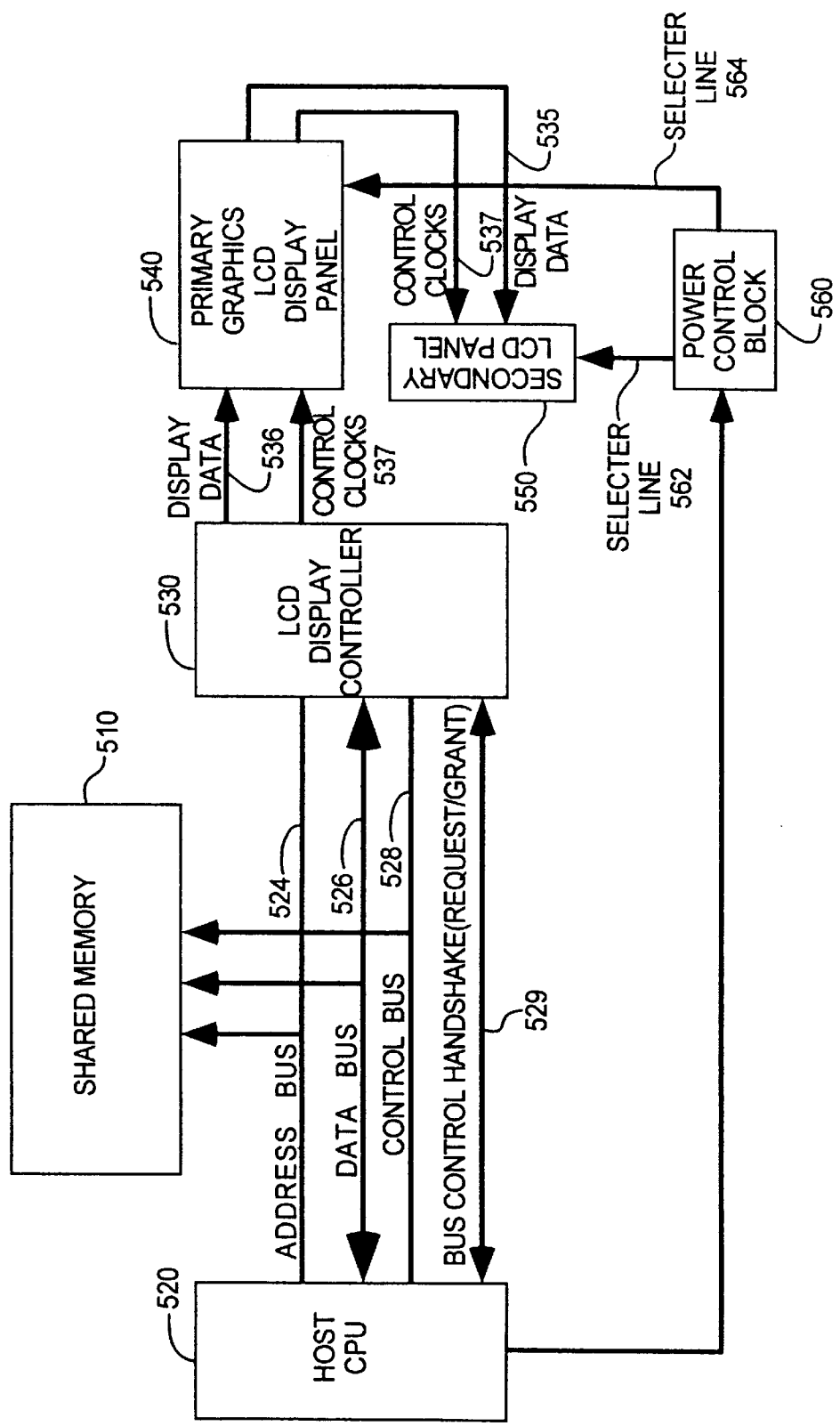
FIG. 5 is a system diagram of a computer system with a dual LCD panel display system according to one embodiment of the invention.

FIG. 5 is a system diagram of a computer system in which a dual LCD panel display system according to one embodiment of the invention may be utilized.

FIG. 5 shows well known elements of a computer system such as a host CPU 520, a shared memory 510 and a display controller 530. In this embodiment, LCD display controller 530 drives and controls a primary graphics LCD display panel 540 and a secondary LCD panel 550. Display controller 530 provides the signals shown in FIG. 4 such as DISPDATA 150. Specifically, display data 535 of FIG. 5 corresponds to DISPDATA 150 of FIG. 4 and control clocks 537 of FIG. 5 refer to all other controller signals, such as FLM 180 which are provided to the LCD. Primary graphics LCD display panel 540 and secondary LCD panel 550 are shown as single blocks in FIG. 5, but include all necessary segment drivers and common drivers, as well as internal input lines and dividers, as shown in FIG. 4 to enable output to the actual LCD panels.

Shared memory 510 services both host CPU 520 and LCD display controller 530 by way of an address bus 524. Address bus 524 carries memory addresses of shared memory 510 to/from CPU 520 and display controller 530. Data bus 526 is capable of sending and receiving to either the CPU 520 or the display controller 530. Data bus 526 delivers raw data to the LCD display controller 530 from which display controller 530 can generate actual display data 535 which are pixels to be output on LCD panels 540 and 550. Control bus 528 is used to control the flow of information from shared memory 510 which is delivered over data bus 526. A bus control (handshake) line transmits request and grant pairs to arbitrate use of the address, control and data bus between CPU 520 and display controller 530.

CPU 520 is a central processing unit, such as the Intel Pentium™ processor and is capable of processing information according to code delivered to it by software or hardware through data bus 526, address bus 524 and control bus 528. The structural detail and functioning of CPU 520 as well as shared memory 510, display controller 530, address bus 524, data bus 526 and control bus 528 are well known to one reasonably skilled in the art of computer systems and will not be described further.

FIG. 5 shows a key feature of the invention which is power control block 560. Power control block 560 may be composed of multiplexers, switches, and transistors and is implemented in accordance with the specifications of CPU 520 and system architecture. Power control block 560 centrally controls the selection and thus, powering of primary LCD panel 540 and secondary LCD panel 550 through the use of selector lines 562 and 564. Power control block 560 drives selector line 562 active when secondary LCD panel 550 is to be enabled for output. If both primary display panel 540 and secondary LCD panel 550 are to be enabled for output, then power control block 560 will also activate selector line 564, such that the primary graphics display panel 540 will also be enabled for output. In the case where the user or software only requests that secondary LCD panel 550 be enabled but not primary LCD panel 540, the power control block 560 will deactivate selector line 564.

The signals VCC1 495 and VCC2 493 of FIG. 4 may originate directly from selector lines 564 and 562, respectively. When selector lines 564 and 562 dictate that both panels 540 and 550 are to be enabled for output, VCC1 495 and VCC2 493 of FIG. 4 will be enabled. Likewise, when only secondary LCD panel 550 is to be enabled, selector line 564 can enable VCC2 493 and disable VCC1 495, thereby powering down the primary graphics LCD display panel 540.

CPU 520, when instructed that only the telecommunications function of the information device is to be used, will send a command to power control block 560. A transistor-implemented switching mechanism or multiplexer will then drive selector line 562 active, while inactivating selector line 564. The switching mechanism or multiplexer(s) are capable of necessary control signals from the CPU in response to a change in function of the information device. The selector lines are independently switched on/off within the power control block allowing more control over power usage.

FIG. 6 is a system diagram of a computer system in which a dual LCD panel display system according to one embodiment of the invention may be utilized.

Where a split-screen LCD panel embodiment is desired, a system similar to that shown in FIG. 2 may be equipped so that selector lines 662 and 664 control enabling of certain segments by providing signals VCC1 195 and VCC2 193, respectively (see FIG. 1 and associated description). For instance, when both selector lines 662 and 664 set high both VCC1 195 and VCC2 193, all four segment drivers and, consequently, both sub-panels 643 and 645 will powered. When VCC2 193 is set high (by selector line 662) and VCC1 195 is set low, only segment driver 120 and consequently, sub-panel 645 will be powered. Within power control block 660, the selector lines 662 and 664 are independently switched using transistor or multiplexors upon receiving commands from CPU 520 regarding device function.

Power control block 660 which generates the signals on selector lines 662 and 664 is coupled to host CPU 520 and consists of components similar to those shown in and described for FIG. 5. Further, CPU 520, shared memory 510, address bus 524, data bus 526, control bus 528 and bus control handshake 529 operate similar to their counterparts shown in and described for FIG. 5 and will not be repeated. LCD display controller 630 of FIG. 6 may be slightly different from counterpart controller 530 in that controller 630 has only one physical display to drive (as opposed to two) and thus, may not require the hardware/software complexity of controller 530 of FIG. 5.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In an information device having a CPU, display controller and a display panel, said display panel split logically into sub-panels, an apparatus comprising:

a plurality of segment drivers coupled between said display panel and said display controller, said segment drivers receiving input data from said controller, said segment drivers translating said data into pixels displayable on said display panel; and a power control block coupled to said CPU and to said segment drivers to disable a first power source which powers down a first set of said segment drivers, said powering down disabling a first set of sub-panels of said display panel from outputting pixels, said power control block disabling said first power source upon receiving a command from said CPU that said first set of sub-panels are to be powered down, said information device functioning as one of a cellular communications device and a personal digital assistant, said first set of sub-panels displaying information relevant to said personal digital assistant function, further wherein said display panel includes a second set of sub-panels displaying information relevant to said cellular communications functions.

2. An apparatus according to claim 1 wherein said power control block disables a second power source which powers down a second set of said segment drivers, said powering down disabling a second set of sub-panels from outputting pixels, said power control block disabling said second power source upon receiving a command from said CPU that said second set of sub-panels are to be powered down.

3. An apparatus according to claim 2 wherein said first power source and said second power source are independently switched by said power-control block to enable outputting of pixels on said first set of sub-panels and said second set of sub-panels, respectively.

4. An apparatus according to claim 1 wherein said information device has a normally open latch, said power control block to disable said first power source when said latch is closed.

5. In an information device having a CPU, display controller, and two display panels, an apparatus comprising:

a first set of segment drivers coupled to said display controller to receive as input a first set of data, said first set of segment drivers translating said first set of data into pixels output on a first of said display panels;

a second set of segment drivers coupled to said display controller and said first set of segment drivers to receive a second set of data, said second set of segment drivers translating said second set of data into pixels output on a second of said display panels; and a power control block coupled to said CPU and to said first and second set of segment drivers to disable a first power source which powers down said second set of segment drivers, said powering down disabling said second display panel from outputting pixels, said information device functioning as one of a cellular communications device and a personal digital assistant, said second displaying panel displaying information relative to said personal digital assistant function, further wherein said first display panel displaying information relevant to said cellular communications function.

6. An apparatus according to claim 5 wherein said power control block disables a second power source which powers down said first set of segment drivers, said powering down disabling said first display panel.

7. An information device having a single display panel logically split into a first and second sub-panel, said device comprising:

a top shell including a top inner shell and top outer shell, said top outer shell on the opposing side of said top inner shell, said top inner shell containing said display panel:

a joint coupled to said top shell for folding said device; and a bottom shell coupled to said top shell through said joint, said bottom shell including a bottom inner shell and a bottom outer shell, said bottom outer shell on the opposing side of said bottom inner shell, said bottom shell having an open area, wherein said open area leaves visible said first sub-panel and hides said second sub-panel when said device is closed about said joint, wherein when said device is closed, a first power signal is disabled to power down said second sub-panel and a second power signal is enabled to power said first sub-panel, said information device functioning as one of a cellular communication device and a personal digital assistant, said second sub-panel displaying information relevant to said personal digital assistant function, and said first sub-panel displaying information relevant to said cellular communications function.

8. An information device according to claim 7 wherein when said device is open, said first signal is enabled to power said second sub-panel and said second power signal is enabled to power said first sub-panel.

9. An information device according to claim 7 wherein said information device is capable of performing a certain function when closed about said joint, said function monitored through said open area.

10. An information device having a two separate display panels, each display panel on separate physical planes, said device comprising:

a top shell including a top inner shell and a top outer shell, said top outer shell on the opposing side of said top inner shell, said top inner shell containing both said display panels;

a joint coupled to said top shell for folding said device; and a bottom shell coupled to said top shell through said joint including a bottom inner shell and a bottom outer shell, said bottom outer shell on the opposing side of said bottom inner shell, said bottom shell having an open area, wherein said open area leaves visible said first display panel and hides said second display panel when said device is closed about said joint, wherein when said device is closed, a first power signal is disabled to power down said second display panel and a second power signal is enabled to power said first display panel, said information device functioning as one of a cellular communications device and a personal digital assistant, said second display panel displaying information relevant to said personal digital assistant function, and said first display panel displaying information relevant to said cellular communications function.

11. An information device according to claim 10 wherein when said device is open, said first power signal is enabled to power said second display panel and said second power signal is enabled to power said first display panel.

* * * * *